(12) United States Patent
Hambloch et al.

(10) Patent No.: US 12,344,331 B2
(45) Date of Patent: Jul. 1, 2025

(54) METHOD FOR DETERMINING A STEERING HYSTERESIS REQUIREMENT, STEERING SYSTEM, COMPUTER PROGRAM PRODUCT AND STORAGE MEDIUM

(71) Applicant: ZF Automotive Germany GmbH, Alfdorf (DE)

(72) Inventors: Peter Hambloch, Krefeld (DE); Andreas Kotz, Duisburg (DE); Martin Gebing, Vreden (DE)

(73) Assignee: ZF Automotive Germany GmbH, Alfdorf (DE)

( * ) Notice: Subject to any disclaimer, the term of this patent is extended or adjusted under 35 U.S.C. 154(b) by 467 days.

(21) Appl. No.: 17/746,177

(22) Filed: May 17, 2022

(65) Prior Publication Data

US 2022/0371656 A1  Nov. 24, 2022

(30) Foreign Application Priority Data

May 18, 2021 (DE) .......................... 102021204995.8

(51) Int. Cl.
*B62D 5/04* (2006.01)
*B62D 6/00* (2006.01)

(52) U.S. Cl.
CPC ........... *B62D 5/0493* (2013.01); *B62D 6/008* (2013.01)

(58) Field of Classification Search
CPC .............................. B62D 5/0493; B62D 6/008
USPC .......................................................... 701/41
See application file for complete search history.

(56) References Cited

U.S. PATENT DOCUMENTS

| | | | |
|---|---|---|---|
| 2012/0072074 A1* | 3/2012 | Greul .................... | B62D 6/008 701/41 |
| 2021/0214002 A1* | 7/2021 | Strecker ................ | B62D 5/006 |

FOREIGN PATENT DOCUMENTS

DE    102019215182 A1    4/2021

* cited by examiner

*Primary Examiner* — Hung Q Nguyen
*Assistant Examiner* — Anthony Donald Taylor, Jr.
(74) *Attorney, Agent, or Firm* — Kristin L. Murphy

(57) ABSTRACT

The present disclosure relates to a method for determining a steering hysteresis requirement of a steering device of a vehicle, a steering system, a computer program product and a computer-readable storage medium. The steering device is part of a steering system of the vehicle and is coupled to at least one actuator. The actuator is set up to apply a steering torque to the steering device. The method comprises at least the step of determining the steering hysteresis requirement based on at least one rack force of the steering system. The steering hysteresis requirement forms at least a component of a target steering torque which can be applied to the steering device by the at least one actuator.

17 Claims, 5 Drawing Sheets

METHOD FOR DETERMINING A STEERING HYSTERESIS REQUIREMENT, STEERING SYSTEM, COMPUTER PROGRAM PRODUCT AND STORAGE MEDIUM

CROSS-REFERENCE TO RELATED APPLICATION

This application claims priority to German Priority Application No. 102021204995.8, filed May 18, 2021, the disclosure of which is incorporated herein by reference in its entirety.

TECHNICAL FIELD

The present disclosure relates to a method for determining a steering hysteresis requirement, a steering system, a computer program product and a computer-readable storage medium.

BACKGROUND

In the case of electromechanical steering systems or steer-by-wire steering systems, a mechanical coupling of the steering device (steering wheel, joystick) with the wheel to be controlled can be dispensed with. In order to provide the user of the vehicle with a natural steering feel despite the lack of mechanical coupling, steering systems of this type have actuators that interact with the steering device. A target steering torque requirement is determined for the actuator. This is compared with an actual steering torque applied to the steering device, so that a corresponding manipulated variable for the actuator can be determined by a control loop. In accordance with the manipulated variable, the actuator acts on the steering device in order to adapt the actual steering torque to the target steering torque, which gives the driver a natural steering feel.

In this context, FIG. 1, which is a partial extract from WO 2019 115 563 A1, discloses a corresponding determination method 10 for a target steering torque requirement 22. A basic steering torque 12 is determined based on input variables of a rack force (RackF) and a vehicle speed (Vspd). In addition, a return torque 14 is determined with input variables of a steering wheel angle (Ipos), a driving torque (Dmom) and the vehicle speed (Vspd). Furthermore, a damping torque 16 is determined with input variables steering wheel angular speed (Ivel), the driving torque (Dmom) and the vehicle speed (Vspd). In addition, a hysteresis torque 18 is determined based on input variables driving torque (Dmom) and vehicle speed (Vspd). Further individual torques are possible, but are of no significance for the present disclosure. A sum torque 20 which determines the target steering torque requirement 22 is then formed from individual torques 12, 14, 16, 18.

However, WO 2019 115 563 A1 discloses with regard to the return torque 14, the damping torque 16 and the hysteresis torque 18 that, with the exception of the vehicle speed, the only input variables used are those that are related directly to the input of the driver or the position or movement of the steering device (steering wheel, joystick). As a result, however, precisely those parameters which are influenced by the result of the control are used as input variables. This is because adaptation of the actual steering torque to the target steering torque requirement through the manipulated variable that is provided for the actuator influences the input variables used. In other words, changes during coordination of the steering feel have an effect on the driver's torque feedback and thus in turn influence the functions that are dependent on the driver and that, according to the prior art, are used as input variables for determining the individual torques 14, 16, 18. As a result, the control mechanism comprises an intrinsic additional loop. Feeding back the control variable and using it as an input signal is at least disadvantageous in terms of control speed, delay and therefore control stability.

In addition, the steering device torque varies with respect to the transverse acceleration of the vehicle, insofar as the steering feel is readjusted or varied (non-linear dependency), and is therefore less predictable. This is especially so since the steering torque always contains a damping component depending on the coordination of the steering feel.

In addition, the intrinsic loop can cause a dip in the steering behavior of the steering device, especially in the central position of the steering device. This occurs when the estimated driver torque deviates from the torque actually applied. Such steering behavior is generally not desired.

With regard to different vehicle parameters, for example the weight as a function of the equipment, the approach according to the prior art is in need of improvement. Using scaling factors, for example, when determining the basic steering torque, a weight adjustment is taken into account in order to give the driver a consistent steering feel. As a result, other functions that use the steering torque as an input variable would also have to be adapted. This process involves considerable effort, is complex and is usually disregarded.

In a similar way, according to the prior art, changes in friction of the road surface are only taken into account indirectly by the force feedback characteristic field in order to report the changes in friction to the driver.

What is needed is to provide a method for determining a target steering torque requirement in which these disadvantages can be eliminated or at least reduced.

SUMMARY

A method, a steering system, a computer program product and a storage medium are provided herein. Advantageous exemplary arrangements are provided in the dependent claims. Individual exemplary arrangements are explained with reference to the method, others with reference to the device. However, the exemplary arrangements can be interchanged appropriately.

According to a first exemplary arrangement, a method for determining a steering hysteresis requirement of a steering device of a vehicle is provided. The steering device is part of a steering system of the vehicle and is coupled to at least one actuator. The actuator is set up to apply a steering torque to the steering device. The method comprises the step of determining the steering hysteresis requirement based on at least one rack force of the steering system. The steering hysteresis requirement forms at least a component of a target steering torque which can be applied to the steering device by the at least one actuator.

The rack force has a substantially fixed relative ratio to the transverse acceleration of the vehicle. As a result, the rack force is independent of the generally variable coordination or readjustment of the steering feel, which can be adapted for the driver by an actuator coupled to the steering device (steering wheel, joystick). The control loop therefore has no additional intrinsic loop using the rack force. The intrinsic loop which is provided in the prior art represents a damping for the hysteresis behavior of the torque. In contrast, the hysteresis of the rack force is lower and more consistent, as it does not include such a coordination-related damping component. For this reason, the determination of the steering hysteresis requirement is advantageously more robust with respect to an adaptation of the driving feel and, on the other hand, the control can take place more quickly because the settling time is shortened. Due to the substantially fixed relative ratio of the rack force to the transverse acceleration, changes in friction of the road surface are also taken into account directly through the use of the rack force. Indirect consideration by characteristic fields, which are necessary in the prior art, can advantageously be avoided. The changes in friction are thus taken into account immediately without a time delay (no additional intermediate steps), wherein the determination of the steering hysteresis requirement nevertheless has a reduced complexity.

The steering hysteresis requirement can also be determined based at least on a vehicle speed, on a steering position determined by the steering system of the vehicle, and on a steering speed determined by the steering system. This enables the steering hysteresis requirement to be determined more precisely.

The steering position determined by the steering system of the vehicle can, for example, be a position of the steering device, that is to say a steering deflection. The position can also be the wheel deflection based on a straight-ahead position. Furthermore, the position can also be a transverse displacement of the rack or the displacement of a tie rod with respect to a normal position (central position). Information about the position can also be supplied by the drive (e.g. a motor) within the steering system. The position can also be an angle of a joint associated with the steering system. Accordingly, the position is a position, determined by the steering system, of a part of the steering system that is displaced in relation to a normal position (straight-ahead position) in the event of a steering deflection. Alternatively, the positions previously mentioned here within the control device can also be determined by conversion on the basis of a reference position (example: motor position converted into rack position).

The steering speed determined by the steering system of the vehicle can, for example, be a speed of the steering device, that is to say a rotational speed of the steering device. However, the speed can also be a deflection rotational speed (steering speed) of a wheel. Furthermore, the speed can also be a displacement speed of the rack or a displacement speed of a tie rod with respect to a normal position (central position). Information about the position can also be supplied by the drive (e.g. a motor) within the steering system. Accordingly, the speed is a displacement speed, rotational speed or steering speed of a part of the steering system, which is determined by the steering system and which is displaced in relation to a normal position (straight-ahead position) in the event of a steering deflection. Usually, the speeds previously mentioned here are also determined within the control device by conversion on the basis of a reference speed (example: motor speed converted into rack speed).

Alternatively or cumulatively, the steering hysteresis requirement can be characterized by an absolute limit value and an absolute gradient value. The rack force can then be taken into account both when determining the absolute limit value and when determining the absolute gradient value of the steering hysteresis requirement. In one exemplary arrangement, the rack force is advantageously used for both sub-parameters of the steering hysteresis requirement, so that the hysteresis can be determined robustly and quickly.

Furthermore, the method can at least also include the step of multiplying at least a first function value and a second function value in order to determine the absolute limit value of the steering hysteresis requirement.

The first function value can be determined at least as a function of the rack force.

The second function value can be determined at least as a function of the vehicle speed.

In addition, the method can include the step of multiplying a third function value and a fourth function value in order to determine the absolute gradient value of the steering hysteresis requirement.

The third function value can be determined as a function of at least the absolute limit value of the steering hysteresis requirement, the steering position determined by the steering system, the steering speed determined by the steering system and the steering hysteresis requirement.

The fourth function value can be determined as a function of at least the vehicle speed. As a result, both the limit value of the steering hysteresis requirement and the gradient value of the steering hysteresis requirement can be precisely determined so that the steering hysteresis requirement as a whole can be determined as required.

At least one of the first to fourth function values can be determined based on at least partially defined functions and/or by characteristic curves and/or by characteristic fields and/or by look-up tables. As a result, the function values can be determined beforehand based on test measurements and can be made available for the driving situation.

The at least partially defined functions and/or characteristic curves and/or characteristic fields and/or look-up tables can be variable as a function of a desired steering feel. In this way, for example, the determination of the steering hysteresis requirement can be adapted to a desired driving style. According to the prior art, the functions, characteristic values or tables are also used in order, with reference to scaling factors, to adapt the steering feel to changed suspension loads that the steering system has to bear. In contrast, the rack force dependency itself advantageously adjusts the steering hysteresis requirement for different suspension loads (vehicle parameters) of different vehicle configurations. Therefore, the functions, characteristic values or tables have fewer variables and are less complex, which improves the precision of the determination.

The rack force can be provided, based on a measurement, on an estimate from a steering model or on a vehicle model. In this respect, a sensor can be provided that measures the applied rack force in order to provide corresponding values. Models can also be used in advance to determine the rack force as a function of vehicle parameters and a vehicle speed. This possibility is based on the substantially fixed relative ratio of the rack force to the transverse acceleration of the vehicle. Furthermore, the rack force can be based on an estimate, provided that the corresponding steering system is based on steering-dependent variables. Of course, the approaches can also be combined.

In one exemplary arrangement, the method is computer-implemented. Accordingly, the determination of the steering hysteresis requirement can be determined by a data processing unit, which has advantages in terms of the speed of precision. In addition, a determination in the vehicle, supported by a data processing unit, is easy to implement, for example via a control device.

If the underlying steering system does not have a rack, but a central rod arranged between the tie rods, the central rod force can also be used instead of the rack force to determine the steering hysteresis requirement. For such a central rod, too, the relative ratio to the transverse acceleration of the vehicle is substantially fixed.

According to a second exemplary arrangement, a steering system for a vehicle is also provided. The steering system comprises at least one steering device, a rack, a control device and at least one actuator. The control device is coupled to the actuator. The control device is set up to determine a steering hysteresis requirement of the steering device according to the method described here. The steering hysteresis requirement forms at least a component of a target steering torque which can be applied to the steering device by the at least one actuator. The steering system thus makes it possible to define the steering hysteresis requirement appropriately and to act on the steering device appropriately, whereby the driver is given an improved steering feel because the determination is made possible more quickly and more precisely.

Alternatively, or cumulatively, the control device can comprise at least one processor and can be coupled to a memory device. At least partially defined functions and/or characteristic curves and/or characteristic fields and/or look-up tables are stored in the memory device, so that at least one of the first to fourth function values can be determined by the control device based on data from the memory device. Using the memory device, the predetermined measured, modeled or estimated function values can then also be made available to the control device for processing for different configurations of the steering feel.

Furthermore, the steering system can comprise at least one sensor, by which a rack force applied to the rack can be measured. Thus, advantageously, the rack force can be measured independently of time. The respective measured value can then be made available to the control device to determine the steering hysteresis requirement.

The steering system can be a steering-by-wire steering system or an electromechanical steering system. The determination of the steering hysteresis requirement can therefore be used in particular for steering systems that have no mechanical coupling between the steering device and steerable components that are used to directly change the direction of the vehicle.

All of the features explained with regard to the second aspect can be transferred to the first aspect individually or in (sub-) combinations.

According to a third exemplary arrangement, a computer program product is provided. The computer program product comprises commands which, when the program is executed by a computer, cause the computer to determine the steering hysteresis requirement according to the method described herein.

According to a fourth exemplary arrangement, a computer-readable storage medium is provided. The storage medium comprises commands which, when the program is executed by a computer, cause the computer to determine a steering hysteresis requirement based on at least one rack force of the steering system.

All of the features explained with regard to the third and fourth aspects can be transferred to the first and/or second aspect individually or in (sub-) combination and also reciprocally.

The present disclosure can also be improved in that a steering damping requirement and/or a steering return torque requirement are also in the method, the steering system, the computer program product and the storage medium, as will be explained below.

In this case, a total target torque requirement is thus determined, which includes the steering hysteresis requirement as well as a steering damping requirement and/or a steering return torque requirement. Scaling factors can be taken into account. The individual totals are determined based at least on the rack force as described herein. The resulting advantages apply cumulatively to the total target torque requirement.

According to an optional fifth exemplary arrangement, the method according to the disclosure can consequently also be supplemented with a method for determining a steering damping requirement of a steering device of a vehicle. The supplementary method can comprise or consist of the step of determining the steering damping requirement based on at least one rack force of the steering system. The steering damping requirement can thus form a component of a target steering torque which can be applied to the steering device by the at least one actuator (total target torque requirement).

The steering damping requirement can also be determined based at least on a vehicle speed, on a steering position determined by the steering system of the vehicle, and on a steering speed determined by the steering system. This enables the steering damping requirement to be determined more precisely.

Alternatively, or cumulatively, the method can also include at least the step of multiplying at least a first function value and a second function value in order to determine the steering damping requirement.

The first function value can be determined at least as a function of the rack force and the second function value can be determined at least as a function of the vehicle speed, the steering position determined by the steering system and the steering speed determined by the steering system. As a result, the steering damping requirement can be determined in an uncomplicated and needs-based manner.

At least one of the first to second function values can be determined based on at least partially defined functions and/or by characteristic curves and/or by characteristic fields and/or look-up tables. As a result, the function values can be determined in advance based on test measurements and can be made available for the driving situation.

The at least partially defined functions and/or characteristic curves and/or characteristic fields and/or look-up tables can be variable as a function of a desired steering feel. In this way, for example, the determination of the steering damping requirement can be adapted to a desired driving style. According to the prior art, the functions, characteristic values or tables are also used in order, with reference to scaling factors, to adapt the steering feel to changed suspension loads that the steering system has to bear. In contrast, the rack force dependency itself advantageously adjusts the steering damping component for different suspension loads (vehicle parameters) of different vehicle configurations. Therefore, the functions, characteristic values or tables have fewer variables and are less complex, which improves the precision of the determination.

If the underlying steering system does not have a rack, but a central rod arranged between the tie rods, in one exemplary arrangement, the central rod force can also be used instead of the rack force to determine the steering damping requirement. For such a central rod, too, the relative ratio to the transverse acceleration of the vehicle is substantially fixed.

According to an optional sixth exemplary arrangement, the steering system according to the disclosure can have a control device which is set up to determine a steering damping requirement of the steering device according to the method described above. The steering damping requirement can form at least a component of a target steering torque which can be applied to the steering device by the at least one actuator. The steering system thus makes it possible to determine the steering damping requirement appropriately and to act on the steering device appropriately, whereby the driver is given an improved steering feel because the determination is made possible more quickly and more precisely.

If the steering system is a steering-by-wire steering system or an electromechanical steering system, the determination of the steering damping requirement can be used in particular for steering systems that have no mechanical coupling between the steering device and steerable components that are used to directly change the direction of the vehicle.

All of the features explained with regard to the sixth exemplary arrangement can be transferred individually or in (sub-)combination to the fifth exemplary arrangement.

According to an optional seventh exemplary arrangement, the computer program product according to the disclosure can comprise commands which, when the program is executed by a computer, cause the computer to determine the steering damping requirement according to the method described herein.

According to an optional eighth exemplary arrangement, the computer-readable storage medium according to the disclosure can comprise instructions which, when the program is executed by a computer, cause the computer to determine a steering damping requirement based on at least one rack force of the steering system.

All of the features explained with regard to the seventh and eighth exemplary arrangements can be transferred individually or in (sub-)combination to the fifth and/or sixth exemplary arrangements and also reciprocally.

According to an optional ninth exemplary arrangement, the method according to the disclosure can also be coupled with a determination of a steering return torque requirement of a steering device of a vehicle—with and without the aforementioned method for determining a steering damping requirement of a steering device. The supplementary method for determining a steering return torque requirement can include the step of determining the steering return torque requirement based on at least one rack force of the steering system. The steering return torque requirement can thus form a component of a target steering torque which can be applied to the steering device by the at least one actuator (total target torque requirement).

Furthermore, alternatively, or cumulatively, the steering return torque requirement can be determined based at least on a vehicle speed, on a steering position determined by the steering system of the vehicle, and on a steering speed determined by the steering system. As a result, the steering return torque requirement can be determined more precisely.

The steering return torque requirement can be determined additionally or alternatively on the basis of a proportional control loop with a proportionality factor and a base target speed.

The rack force can be taken into account both when determining the proportionality factor and when determining the base target speed. The proportional control loop enables a particularly fast adjustment in order to determine the steering return torque requirement. The rack force is advantageously used for both sub-parameters of the proportional control loop, so that the control loop is robust and fast.

Alternatively, or cumulatively, the determination can also include at least the step of multiplying at least a first function value and a second function value in order to determine a product value.

The first function value can be determined at least as a function of the rack force.

The second function value can be determined at least as a function of the vehicle speed and the steering position determined by the steering system.

In addition, the method can include the step of subtracting the steering speed determined by the steering position from the product value in order to determine the base target speed of the proportional control loop.

The method can also include the step of multiplying the base target speed by a third and a fourth function value.

The third and fourth function values together can represent the proportionality factor.

The third function value can be determined at least as a function of the rack force. The fourth function value can be determined at least as a function of the vehicle speed and the steering position determined by the steering system. As a result, both the proportionality factor and the base target speed can be precisely determined so that the steering return torque requirement can be determined as required.

At least one of the first to fourth function values can be determined based on at least partially defined functions and/or by characteristic curves and/or by characteristic fields and/or by look-up tables. As a result, the function values can be determined in advance based on test measurements and can be made available for the driving situation.

The at least partially defined functions and/or characteristic curves and/or characteristic fields and/or look-up tables for determining the steering return torque requirement can be variable as a function of a desired steering feel. In this way, for example, the determination of the steering return torque requirement can be adapted to a desired driving style. According to the prior art, the functions, characteristic values or tables are also used in order, with reference to scaling factors, to adapt the steering feel to changed suspension loads that the steering system has to bear. In contrast, the rack force dependency itself advantageously adjusts the active restoring component for different suspension loads (vehicle parameters) of different vehicle configurations. Therefore, the functions, characteristic values or tables have fewer variables and are less complex, which improves the precision of the determination.

The rack force can be provided, based on a measurement, on an estimate based on a steering model or on a vehicle model. In this respect, a sensor can be provided that measures the applied rack force in order to provide corresponding values. Models can also be used in advance to determine the rack force as a function of vehicle parameters and a vehicle speed. This possibility is based on the substantially fixed relative ratio of the rack force to the transverse acceleration of the vehicle. Furthermore, the rack force can be based on an estimate, provided that the corresponding steering system is based on steering-dependent variables, vehicle parameters and the vehicle speed. Of course, the approaches can also be combined.

The method which is expanded to include the determination of the steering return torque requirement can also be computer-implemented. Accordingly, the determination of the steering return torque requirement can be determined by a data processing unit, which has advantages in terms of the speed of precision. If the underlying steering system does not have a rack, but a central rod arranged between the tie rods, the central rod force can also be used instead of the rack force to determine the steering return torque requirement. For such a central rod, too, the relative ratio to the transverse acceleration of the vehicle is substantially fixed.

According to an optional tenth exemplary arrangement, the steering system according to the disclosure for a vehicle can be set up to determine a steering return torque requirement of the steering device according to the method described above. The steering return torque requirement can form at least a component of a target steering torque which can be applied to the steering device by the at least one actuator. The steering system thus makes it possible to determine the steering return torque requirement appropriately and to act on the steering device appropriately, whereby the driver is given an improved steering feel because the determination is made possible more quickly and more precisely.

As already mentioned, the control device can comprise at least one processor and can be coupled to a memory device. At least partially defined functions and/or characteristic curves and/or characteristic fields and/or look-up tables for determining the steering return torque requirement can be stored in the memory device, so that at least one of the first to fourth function values can be determined by the control device based on data from the memory device. Using the memory device, the predetermined measured, modeled or estimated function values can then also be made available to the control device for processing for different configurations of the steering feel.

If the steering system comprises at least one sensor, by which a rack force applied to the rack can be measured, the respective measured value can be made available for the control device to determine the steering return torque requirement.

The determination of the steering return torque requirement can therefore be used in particular for steering systems that have no mechanical coupling between the steering device and steerable components that are used to directly change the direction of the vehicle.

All of the features explained with regard to the tenth exemplary arrangement can be reciprocally transferred individually or in (sub-)combination to the ninth exemplary arrangement.

According to an optional eleventh exemplary arrangement, the computer program product according to the disclosure can comprise instructions which, when the program is executed by a computer, cause the computer to determine the steering return torque requirement according to the method described herein.

According to an optional twelfth exemplary arrangement, the computer-readable storage medium according to the disclosure can comprise instructions which, when the program is executed by a computer, cause the computer to determine a steering return torque requirement based on at least one rack force of the steering system.

All of the features explained with regard to the eleventh and twelfth exemplary arrangements can be transferred individually or in (sub-)combination to the ninth and/or tenth exemplary arrangements and also reciprocally.

BRIEF DESCRIPTION OF DRAWINGS

The disclosure and further advantageous exemplary arrangements and developments thereof are described and explained in more detail below with reference to the examples shown in the drawings. The features to be seen in the description and the drawings can be used individually or collectively in any combination according to the disclosure. In the drawings.

DETAILED DESCRIPTION

Figure 1:
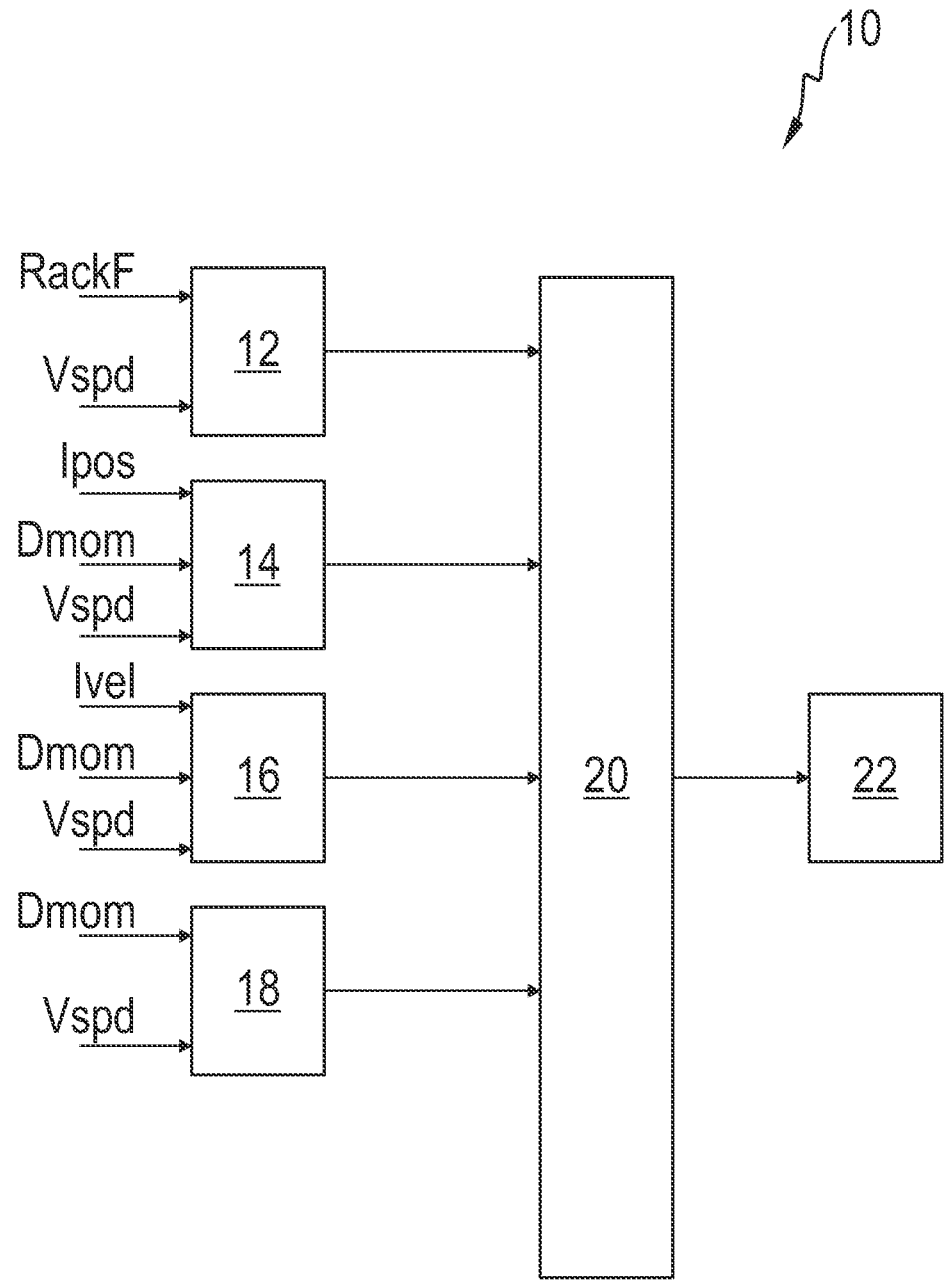
FIG. 1 is a simplified schematic representation of the determination of a total steering torque requirement according to the prior art.
Figure 2:
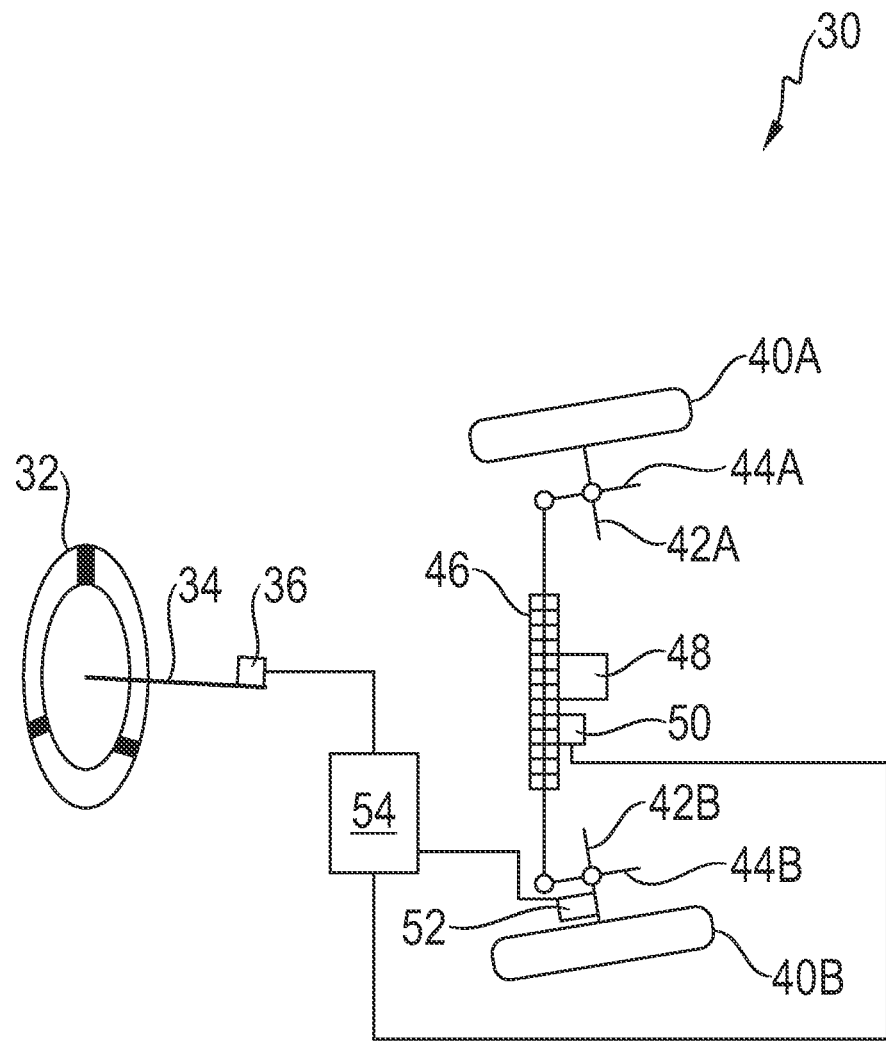
FIG. 2 is a simplified schematic representation of a steering system.

FIG. 2 is a simplified schematic representation of a steering system 30. The steering system 30 comprises a steering device 32, in this case a steering wheel. The steering device 32 is coupled to an axle 34. An actuator 36 which interacts with the axis 34 is arranged on the axle. A manipulated variable can be applied to the actuator 36 in order to exert a torque on the axle 34 in accordance with the manipulated variable and thus to report a desired steering feel to the driver.

The steering device 32 and its axle 34 are mechanically separated from the rest of the steering system 30, of which the steerable wheels 40A, 40B are shown here by way of example. The wheels 40A, 40B are each coupled to a wheel carrier 42A, 42B, which in turn are in each case coupled to a tie rod 44A, 44B. A rack 46 is arranged between the tie rods 44A, 44B. The rack 46 provides a mechanical coupling for the wheels 40A, 40B so that they are always aligned parallel to one another.

An actuator 48 (pinion) is coupled to the rack 46 and can move the rack out of its central position in order to cause a deflection of the wheels 40A, 40B relative to their normal position.

A sensor 50 which measures the rack force is also coupled to the rack 46. For example, the sensor 50 can be a strain gauge.

There is also a second sensor 52. The second sensor 52 is set up to determine a relative position of the wheel carrier 42A relative to its normal position. This relative position represents a steering position determined by the steering system of the vehicle. The sensor 52 is also set up to measure the rotational speed of the wheel carrier 42A with respect to the center of rotation when the position of the wheel 40B changes. Of course, this does not mean the wheel rotation, but the steering rotation. This rotational speed represents a steering speed determined by the steering system of the vehicle.

The steering system further comprises a control device 54 having a processor. The control device 54 is coupled both to the actuator 36 and also to the sensors 50, 52. The sensors 50, 52 transmit corresponding measured values for the rack force, the steering position and the steering speed to the control device 54. The control device also receives information about the vehicle speed. The vehicle speed can optionally also be determined by the sensor 52 or by suitable other devices. The control device 54 is set up to determine at least a steering return torque requirement and/or a steering hysteresis requirement and/or a steering damping requirement based on the information received. Alternatively, or cumulatively, the control device 54 can also determine a total target torque requirement from a desired combination of the individual torques.

The control device 54 can optionally be coupled to a memory device in which partially defined functions, characteristic values or reference tables can be stored in order to be able to use them in the determination by the control device 54.

Optionally, the control device 54 can be set up to compare the specific steering torque requirement with an actual steering torque. A manipulated variable for the actuator 36 can then be determined and transmitted to the actuator in order to match the actual steering torque to the steering torque requirement. In any case, the specific steering torque requirement is the variable on which the control of the actuator 36 is based, in order to convey the desired steering feel to the driver.

Figure 3:
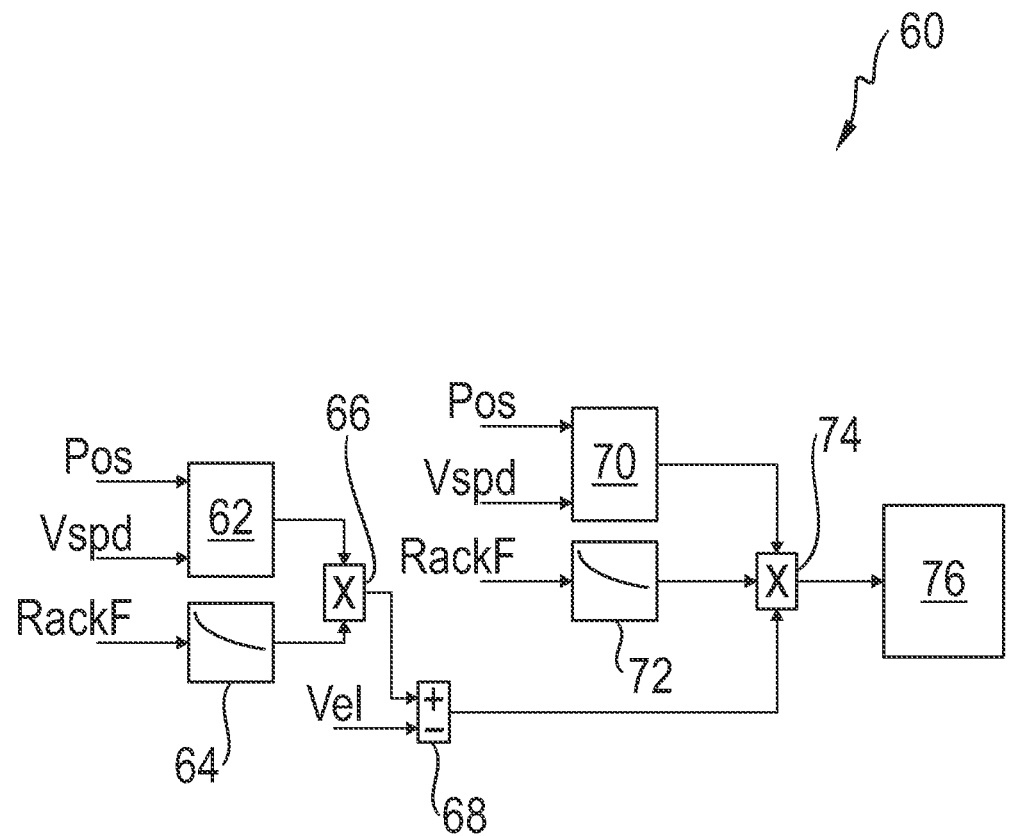
FIG. 3 is a simplified schematic representation of the determination of the steering return torque requirement according to one exemplary arrangement.

FIG. 3 is a simplified schematic representation of the determination of the steering return torque requirement according to one exemplary arrangement 60.

A first function value is determined in the block 62 as a function of a steering position Pos, which is determined by the steering system of the vehicle, and the vehicle speed Vspd. A second function value is determined in the block 64 as a function of the rack force RackF. The first and second function values are multiplied in the block 66 to determine a product value. The steering speed Vel determined by the steering system of the vehicle is then subtracted from the product value in the block 68. In this way a base target speed is determined.

In the block 70 a third function value is determined based on a steering position Pos, which is determined internally by the steering system or externally in the vehicle, and the vehicle speed Vspd. In block 72, a fourth function value is determined based on the rack force RackF. The third and fourth function values represent a proportionality factor. The third and fourth function values are then multiplied in the block 74 by the product value from the block 68, that is to say the base target speed. As a result, the steering return torque requirement can be determined in the block 76.

The blocks 62, 64, 70, 72 can comprise at least partially defined functions and/or characteristic values and/or characteristic fields and/or reference tables in order to be able to adapt the values determined in each case to a desired driving feel.

Figure 4:
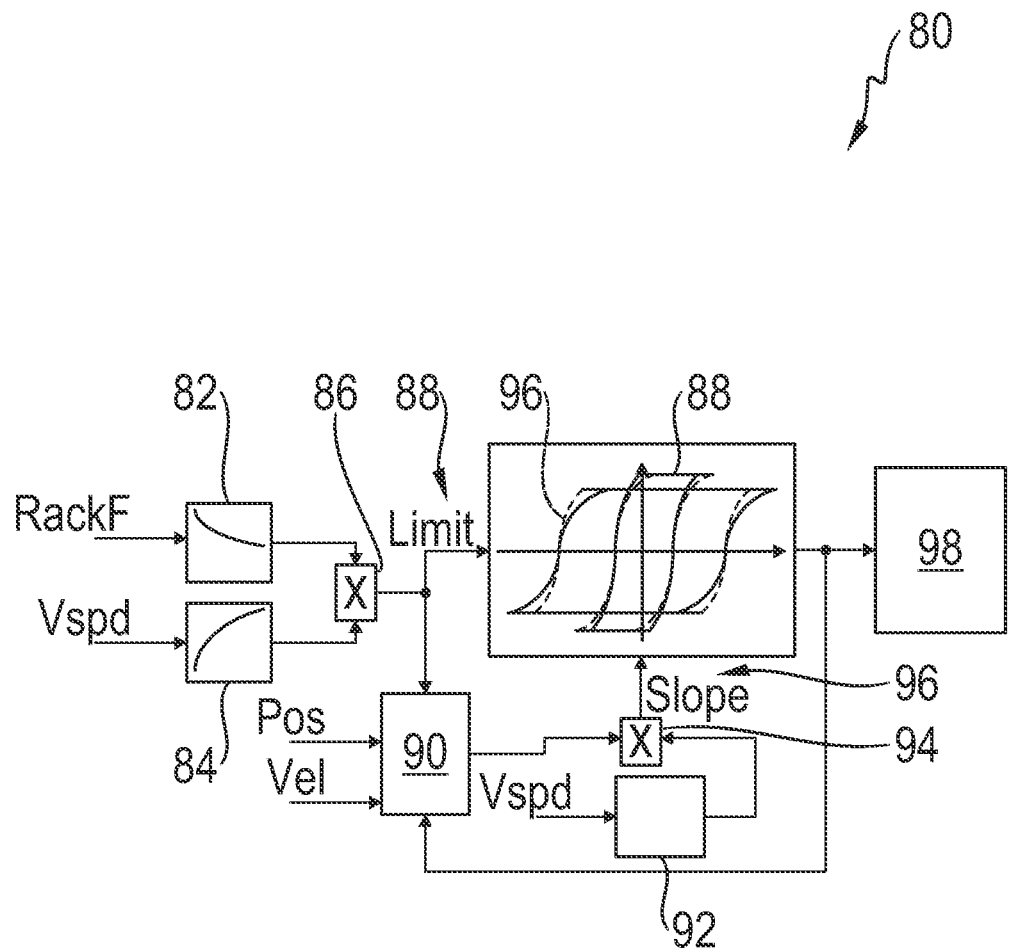
FIG. 4 is a simplified schematic representation of the determination of the steering hysteresis requirement according to one exemplary arrangement.

FIG. 4 is a simplified schematic representation of the determination of the steering hysteresis requirement according to an exemplary arrangement 80.

In the block 82, a first function value is determined as a function of the rack force RackF, In the block 84, a second function value is determined based on the vehicle speed Vspd. The first and second function values are multiplied in the block 86. As a result, an absolute limit value (Limit) of the steering hysteresis requirement is determined.

In addition, a third function value is determined in the block 90 based on the steering position Pos determined by the steering system, the steering speed Vel determined by the steering system and the limit value determined beforehand. As an additional input variable for determining the third function value, the block 90 comprises a feedback loop, so that the determined steering hysteresis requirement is also taken into account.

In the block 92, a fourth function value is determined based on the rack force RackF.

The third and fourth function values are multiplied in the block 94 in order to determine the absolute gradient value (Slope) of the steering hysteresis requirement.

As a result, the steering hysteresis requirement is determined both in the limit value and in the gradient, so that the situation-dependent steering hysteresis requirement is determined in the block 98.

The blocks 82, 84, 90, 92 can comprise at least partially defined functions and/or characteristic values and/or characteristic fields and/or reference tables in order to be able to adapt the values determined in each case to a desired driving feel.

Figure 5:
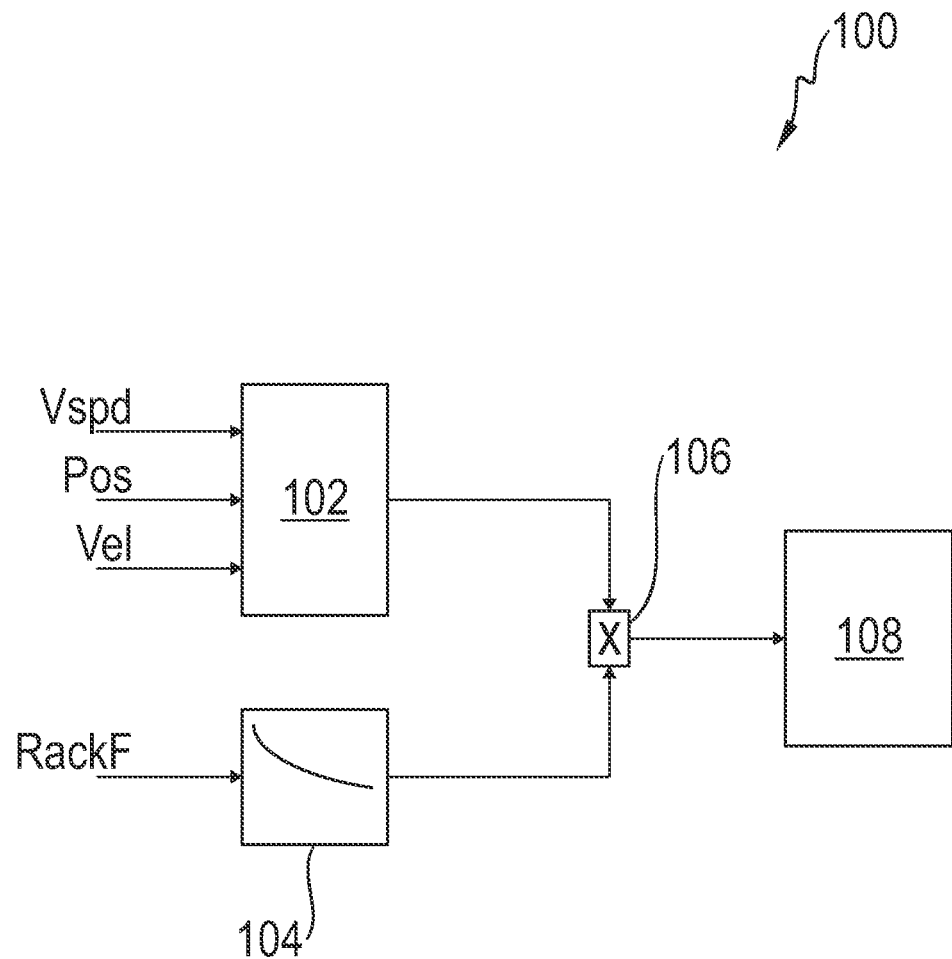
FIG. 5 is a simplified schematic representation of the determination of the steering damping requirement according to one exemplary arrangement.

FIG. 5 shows a simplified schematic representation of the determination of the steering damping requirement according to an exemplary arrangement 100.

A first function value is determined in the block 102 as a function of a vehicle speed Vspd, a steering position Pos determined by the steering system of the vehicle and a steering speed Vel determined by the steering system of the vehicle. Based on the rack force RackF, a second function value is determined in the block 104. The first and second function values are multiplied in the block 106 in order to determine the steering damping requirement in the block 108.

The blocks 102, 108 can comprise at least partially defined functions and/or characteristic values and/or characteristic fields and/or reference tables in order to be able to adapt the values determined in each case to a desired driving feel.

Although the disclosure has been shown and described with respect to one or more implementations, those skilled in the art upon reading and understanding this description and the accompanying drawings will identify equivalent changes and modifications. Furthermore, while a particular feature of the disclosure may have been disclosed in relation to only one of a plurality of implementations, this feature can be combined with one or more other features of the other implementations.

The invention claimed is:

1. A method for determining a steering hysteresis requirement of a steering device of a vehicle, wherein the steering device is part of a steering system of the vehicle and is coupled to at least one sensor and at least one actuator which is configured to apply a target steering torque to the steering device, the method comprising:
   taking measurements corresponding to at least one rack force of the steering system via the at least one sensor;
   determining an absolute limit value of the steering hysteresis requirement and an absolute gradient value of the steering hysteresis requirement based at least in part on the measurements corresponding to the at least one rack force of the steering system taken via the at least one sensor;
   determining the steering hysteresis requirement based on the determined absolute limit value of the steering hysteresis requirement and the determined absolute gradient value of the steering hysteresis requirement, wherein the steering hysteresis requirement forms at least one component of the target steering torque; and
   activating the at least one actuator to act upon the steering device to apply the target steering torque to the steering device.

2. The method according to claim 1, wherein the at least one sensor comprises at least one first sensor and at least one second sensor, wherein the at least one first sensor is used to measure the at least one rack force and the at least one second sensor is used to measure at least one of a vehicle speed, a steering position, and a steering speed, and wherein the steering hysteresis requirement is based on measurements taken via the at least one first sensor and the at least one second sensor the steering hysteresis requirement is further determined based on the at least one sensor.

3. The method according to claim 1, wherein the method further comprises:
   multiplying at least a first function value and a second function value in order to determine the absolute limit value of the steering hysteresis requirement, wherein the first function value is determined at least as a function of the at least one rack force, and wherein the second function value is determined at least as a function of a vehicle speed; and
   multiplying at least a third function value and a fourth function value in order to determine the absolute gradient value of the steering hysteresis requirement, wherein the third function value depends on at least the absolute limit value of the steering hysteresis requirement, a steering position, and a steering speed, and wherein the fourth function value is determined as a function of at least the vehicle speed.

4. The method according to claim 3, wherein at least one of the first, second, third, and fourth function values is determined based on one or more of at least partially defined functions, characteristic curves, characteristic fields, and/or look-up tables.

5. The method according to claim 4, wherein at least one of the at least partially defined functions, characteristic curves, characteristic fields, and look-up tables is variable as a function of a desired steering feel.

6. The method according to claim 1, wherein the at least one rack force is determined based on the measurements taken via the at least one sensor and at least one estimate from a steering model or from a vehicle model.

7. The method according claim 1, wherein the method is computer-implemented.

8. A steering system for a vehicle, wherein the steering system comprises a steering device, a rack, a control device, and at least one actuator, wherein the control device is coupled to the at least one actuator, and wherein the control device is configured to determine a steering hysteresis requirement of the steering device according to the method of claim 3.

9. The steering system according to claim 8, wherein the control device comprises at least one processor and is coupled to a memory device, wherein one or more of at least partially defined functions, characteristics curves, characteristic fields, and look-up tables are stored in the memory device, so that at least one of the first, second, third, and fourth function values can be determined by the control device based on data from the memory device, and wherein the at least one processor is configured to determine the steering hysteresis requirement based on the at least one of the first, second, third, and fourth function values.

10. The steering system according to claim 8, wherein the steering system further comprises at least one sensor via which the at least one rack force can be measured.

11. The steering system according to claim 8, wherein the steering system is a steering-by-wire steering system.

12. A computer program product, comprising commands which, when the computer program product is executed by a computer, cause the computer to determine a steering hysteresis requirement according to the method of claim 1.

13. A computer-readable storage medium, comprising the computer program product of claim 12.

14. The method according to claim 1, wherein the at least one sensor and the at least one actuator are coupled to a control device configured to determine the steering hysteresis requirement of the steering device.

15. A steering system for a vehicle, wherein the steering system comprises a steering device, a rack, a control device, and at least one actuator, wherein the control device is coupled to the at least one actuator, and wherein the control device is configured to determine a steering hysteresis requirement of the steering device according to the method of claim 1.

16. The steering system according to claim 8, wherein the steering system is an electromechanical steering system.

17. The method according to claim 3, wherein the at least one rack force is determined based on the measurements taken via the at least one sensor and at least one estimate from a steering model or from a vehicle model.

* * * * *